Patented Feb. 21, 1933

1,898,774

UNITED STATES PATENT OFFICE

ROBERT G. GUTHRIE AND OSCAR J. WILBOR, OF CHICAGO, ILLINOIS, ASSIGNORS TO WILLIAM J. MOHR, OF CHICAGO, ILLINOIS

TREATMENT OF VERMICULITE AND THE LIKE

No Drawing.   Application filed January 26, 1931.   Serial No. 511,436.

We have made the valuable discovery that vermiculite and analogous or similar ores, minerals and materials, the composition of which has heretofore been largely unknown or misunderstood, contains substantial quantities of practically-pure silica in substantially-flat plate or flake form, and that it is possible to liberate or extract such silica for commercial use by appropriate treatment of the ore.

This release of such silica plates or flakes, which are of especial value because of their purity and their very thin form, and due to their highly adsorptive and absorptive properties, is made possible apparently by reason of the fact that these types of material, mineral or ore, consist of pseudo rather than real silicates in the sense that the components of the aluminum, magnesium calcium and iron ingredients of the more or less complex ore are merely coatings over the surfaces of the silica flakes or plates, and hence capable of relatively easy separation by chemical means.

The distinction between the high-purity silica derived from these ores by our new process and other forms of more or less pure silica is that this new extracted product is the only form known, so far as we are advised, in which the silica is in flat, plate-like form, and apparently retains this physical characteristic irrespective of the degree of fineness to which it is pulverized.

Other natural and synthetic forms of silica occur in more of the globular or solid geometrical figures, but, so far as is known, not in the flat, plate-like form in which a relatively large surface is presented for a given mass.

In the case of these other physical forms of silica, there is comparatively small surface for the mass, and the value of the new product depends in large measure upon the shape and physical form of its component plates.

Other products result from the practice of this novel process, and their manner of production will be made clear from an understanding of the present preferred method of treatment of the vermiculite, which will now be set forth in more or less detail.

The vermiculite ore may occur in nature as granules (fines), chunks, plates or related forms, but inherently the individual particles forming these variously-shaped bodies are more or less substantially-flat, extremely-thin plates.

The crude ore is first crushed or ground by any well-known method to a size desirably between 5 and 20 mesh, for example, about 15 mesh.

Such ground ore is then subjected to any usual or common separating or cleaning process to free it, in large measure, from dirt and water-soluble materials which may be present in the ore.

Thereupon, the non-water soluble residues, which comprise the cleaned ore, are treated with sulphuric acid, desirably of a concentration between ten (10%) per cent. to sixty (60%) per cent. sulphuric acid, for a sufficient length of time and at a temperature and pressure to dissolve the oxides, metals, and combinations or compounds and any other materials, organic or inorganic, which are usually associated in nature with such ore, and which, in the case of vermiculite, probably comprise coatings over and around the more or less pure silica plates, thereby releasing the white, flat, plate-like silica referred to.

If desired, the temperature and pressure employed may be that of the atmosphere.

The materials, other than the silica, referred to, have been found to be principally magnesium oxide, aluminum oxide, calcium oxide, sodium oxide, iron oxides, their hydroxides, and similarly related compounds of magnesium, aluminum, calcium, sodium, iron, their silicates, and possibly others.

The heat of the chemical reaction and the presence of the sulphuric acid and the moisture in the ore tend to expand or exfoliate the laminated particles, and this enlargement aids in the separation of the silica plates and in the effective, and efficient reaction between the acid and the materials of the ore other than the silica.

After this treatment, there remains a liquid solution of various sulphates, solid residues consisting principally of these flat white, silica plates, a dark solid in the form of associated rock, and a colloidal semi-solid.

The next step in the process is to separate the mixture of solids and semi-solids from the liquid solution, and then such mixture, which may consist, in some instances, of about fifty-six (56%) per cent. silica, approximately thirty-four (34%) per cent. associated rock, and in the neighborhood of ten (10%) per cent. semi-solid colloid by volume, is separated by the well-known flotation or gravitation concentrating methods into the three materials specified.

This is ordinarily accomplished in the following manner:

The residual, associated rock is first separated from the white, flat, plate-like silica flakes and the colloidal semi-solid, and then such colloid is partially dissociated from the silica plates or left wholly in company with such plates, and then the silica plates or flakes are dried, and they are then in their final form for commercial use.

Some of the specified colloid is apparently formed in the following manner during the performance of the process:

The sulphuric acid takes into solution the silicates and/or other compounds that are in contact with or that accompany the flat, silica plates and related materials, and breaks these compounds down into sulphates, releasing silica in a colloidal state $(SiO_2+XH_2O$, known as silicic acid), whose separation or precipitation from a true colloidal solution is aided by reason of the presence of the aluminum sulphate in the solution.

This method of producing colloidal silicic acid, as a part of the general process, renders it more readily available, as compared with other methods, so far as time, expense and ease of operation are concerned.

The final, flat, plate-like silica recovered from the vermiculite in the manner stated possesses great adsorptive and absorptive properties which give it substantial, commercial value.

The salts of the separated solution are precipitated in any of the well-known methods of fractional crystallization, and the main products of such treatment are alum, aluminum sulphate, iron sulphates (ferric and ferrous) and magnesium sulphate.

In this connection, it is to be noted that the presence of the aluminum sulphate causes or aids the earlier agglomeration of the semi-solid colloid from the solution before the first separation referred to.

The treatment above specified consists in using with the vermiculite ore a weight of concentrated sulphuric acid commensurate with the weight of the substances, other than the pure silica plates, contained in the ore for a sufficient time to result, after separation, in a white, plate-like residue which has been found by analysis to be silicon dioxide of a purity ranging from ninety (90%) per cent. to ninety-nine and two-tenths (99.2%) per cent. or higher.

Although we have herein referred to sulphuric acid as the preferable acid to be used, it is to be observed that the process in the production of the flat, plate-like silica can be performed by the use of any of the more common acids, such as hydrochloric, nitric, acetic, aqua regia, their acid salts, various combinations, etc.

As a specific example of how the process may be practiced to procure the products referred to, one hundred (100) pounds of the ground or crushed vermiculite, or similar or analogous ore, is placed in a vessel, such as a porcelain, evaporating receptacle of large dimensions, or a lead-lined container of appropriate size, equipped with suitable means for heating the contents to a temperature of about two hundred (200°) degrees Fahrenheit.

Approximately two hundred and twenty (220) pounds of water are then added, and to this mixture about one hundred and ten (110) pounds of concentrated sulphuric acid (66° Bé.) is slowly poured in, it being obvious that the addition of the acid to the water in this manner is for the purpose of economically realizing the heat of the reaction as much as possible.

Thereupon, the vessel and its contents are heated to about two hundred (200°) degrees Fahrenheit, which temperature is desirably maintained constant during the process.

A slight excess of sulphuric acid accelerates the reaction, which may be further hastened by agitating or stirring the contents of the container to expose the surfaces of the particles comprising the ore more readily to the acid.

The compounds most easily soluble in sulphuric acid are first attacked and dissolved by such acid, these being the loose, acid-soluble silicates, oxides, etc., lightly or in slight degree adhering to the ore particle which are undergoing expansion due to the temperature, and due also to the withdrawal from them of a certain amount of water by the action of the sulphuric acid and heat.

The next compounds to be taken into solution are those soluble in sulphuric acid, and which more closely or more firmly adhere to and are also present between the laminae of the silica plates.

Evidence of the solution and removal of these compounds is presented in the fact that such originally-dark, laminated silica plates first begin to appear white at their thin edges, and this whitening and purifying and cleaning action continues progressively until all of the silica plates are a complete, clear, shiny white of pleasing appearance.

Just prior to the completion of the process, the silica plates will ordinarily, individually show a small, dark dot or spot at substantially the center of its flat surface, completely surrounded by an area which is much lighter in color, and in practically all instances substantially white, indicating apparently that the original vermiculite, laminated plates are coated with thin films of compounds which are gradually dissolved off by the acid.

Owing to the high degree of capillarity of the laminated, silica plates, the action of the sulphuric acid to seek out and act on the acid-soluble impurities and compounds within and on the plates is facilitated and hastened.

The time required to complete the dissolving process depends upon several factors, among which may be mentioned the temperature, the strength of the acid solution employed, maintenance of an excess of acid over that actually required to perform its function, the relative amount of surface of the ore presented to the action of the acid, and it may vary from ten minutes to several hours.

The remainder of the process is then proceeded with in the manner clearly stated above.

Furthermore, we have found that the flat, plate-like silica existing in the crude ore, as noted above, or combined physically with various silicates, their attendant oxides, hydroxides, carbonates, etc., may be preliminarily partially expanded or separated by exfoliation with heat, and then treated with the acid, and the result is not essentially different from treating the unheated, crude ore, except that these impure, flat, laminated plates will be expanded, putting the ore in better condition for efficient subsequent treatment with the acid.

Care must be exercised, however, in employing heat for this enlargement or swelling purpose, not to calcine the ore, because in so doing the possibility of reclaiming the pure, silica plates by the specified chemical treatment would have been practically or largely eliminated, since, apparently, the effect of a high-temperature calcining treatment is to produce combinations of these various oxides, hydroxides, minerals, etc., to form compounds, presumably silicates, not readily attacked by acids or other chemicals.

From observation, it appears that the vermiculite expands upon heating in proportion to the temperature and in proportion to the time of heating, irrespective of the temperature, provided such temperature is above the boiling point of water, whereby to effect the distension or swelling by the production of steam from the contained moisture.

Consequently, in some instances, it may be feasible and of value to subject the vermiculite to a preliminary or initial heat action prior to the acid treatment referred to, and the temperature employed would be below one thousand (1000°) degrees Fahrenheit, and preferably at about three hundred (300°) degrees Fahrenheit, thus avoiding calcination and the production of chemical compounds which could not be readily removed by the acid process.

Although we have herein, in some measure, presented theories regarding the new process, we do not wish necessarily to be confined thereto, the process, however, having been actually demonstrated by us to be operative to produce the specified novel products.

It is to be understood that this invention, as defined by the appended claims, and which covers the process and product, is not necessarily limited and restricted to the precise and exact details set forth in this specification, and that many minor or more or less major changes may be incorporated in the procedure without departure from the heart and essence of the invention, and without the loss or sacrifice of any of its substantial benefits and advantages.

We claim:

1. A highly-adsorptive medium composed of a body of substantially-pure silica in the form of practically-flat plates or flakes.

2. The method of producing practically-pure silica in commercial quantity in the form of substantially-flat highly-adsorptive plates or flakes consisting in releasing such plates or flakes in a vermiculite from other constituents of the ore by treating the ore with acid, thereby dissolving such other ingredients of the ore in the acid, and separating such silica from the resulting solution and from the residual undissolved components of the ore.

3. The method of producing practically-pure silica in commercial quantity in the form of substantially-flat highly-adsorptive plates or flakes consisting in releasing such plates or flakes in a vermiculite from other constituents of the ore by treating the ore with sulphuric acid, thereby dissolving such other ingredients of the ore in the acid, and separating such silica from the resulting solution and from the residual undissolved components of the ore.

4. The method of producing practically-pure silica in commercial quantity in the form of substantially-flat highly-adsorptive plates or flakes consisting in releasing such plates or flakes in a vermiculite from other constituents of the ore by treating the ore with acid, thereby dissolving such other ingredients of the ore in the acid, separating the mixture of solids and semisolid colloid from the resulting solution, and individually separating from such mixture the practically-pure silica in the form of substantially-flat plates or flakes, the associated rock, and such of the semi-solid colloid as is unadhered to such plates and rock.

5. The method of producing practically-pure silica in commercial quantity in the form of substantially-flat highly-adsorptive plates or flakes consisting in releasing such plates or flakes in a vermiculite from other constituents of the ore by treating the ore with sulphuric acid, thereby dissolving such other ingredients of the ore in the acid, separating the mixture of solids and semi-solid colloid from the resulting solution, and individually separating from such mixture the practically-pure silica in the form of substantially-flat plates or flakes, the associated rock, and such of the semi-solid colloid as is unadhered to such plates and rock.

In witness whereof we have hereunto set our hands.

ROBERT G. GUTHRIE.
OSCAR J. WILBOR.